United States Patent [19]

Altmayer

[11] 4,186,401

[45] Jan. 29, 1980

[54] CITIZENS BAND MOBILE ANTENNA MOUNTING STRUCTURE

[75] Inventor: John Altmayer, Cape Coral, Fla.

[73] Assignee: Hustler, Inc., Kissimmee, Fla.

[21] Appl. No.: 900,147

[22] Filed: Apr. 26, 1978

[51] Int. Cl.² .............................................. H01G 1/32

[52] U.S. Cl. .................................... 343/715; 343/906; 174/153 A

[58] Field of Search ................ 343/749, 750, 711-715, 343/900, 887-889, 892, 906; 174/138 A, 152 A, 153 A, 158 R

[56] References Cited

U.S. PATENT DOCUMENTS

| | | | |
|---|---|---|---|
| 3,541,554 | 11/1970 | Shirey | 343/750 |
| 4,090,030 | 5/1978 | Lagasse | 343/715 |
| 4,106,024 | 8/1978 | Nijman | 343/715 |

*Primary Examiner*—David K. Moore

*Attorney, Agent, or Firm*—Meyer, Tilberry & Body

[57] ABSTRACT

An upper loaded citizens band antenna is provided which is capable of being mounted on various types of mobile antenna mounts designed for use in conjunction with base loaded antennas. By combining the upper loaded antenna with an interconnection means capable of mating with various base loaded mounts, improved transmission and reception is provided while maintaining the convenience normally associated with the base loaded antennas.

5 Claims, 1 Drawing Figure

CITIZENS BAND MOBILE ANTENNA MOUNTING STRUCTURE

This invention pertains to the art of radio antennas for transmitters and/or receivers and more particularly to antennas capable of being mounted on vehicles.

The invention is particularly applicable to improving the transmitting and receiving efficiency of existing base loaded mobile citizens band antenna systems and will be described with particular reference thereto.

BACKGROUND OF THE INVENTION

Many mobile citizens band antennas currently in use are comprised of a mounting means capable of being temporarily affixed to a surface on a vehicle and a base loaded vertical antenna having a threaded interconnection so that the antenna can be detached from the mounting means. This type of antenna has found favor among the public because it can be easily dismounted from a vehicle and stowed out of sight. The dismounting procedure can be accomplished in two ways. With many mobile antenna mounts, the mount itself is easily disengaged and can be repeatedly removed and reattached. With other types, the mount is more permanently attached and the antenna is simply unscrewed from the mount for stowage. The antennas supplied with these mounts have in the past been base loaded antennas. Base loaded antennas are comprised of a vertical flexible conducting rod and an integral loading coil in a housing at the base of the rod. The coil housing normally has a threaded socket which screws onto a male threaded stud on the mount so as to connect the antenna to the mount both mechanically and electrically. These studs ordinarily have a $\frac{5}{8}\times 20$ thread.

Upper loaded antennas, that is to say a vertical flexible conducting rod having a loading coil intermediate its ends, have also been used with mobile citizens band antenna systems.

Loading coils are employed to increase the effective electrical length of the antenna beyond its physical length so that the antenna presents a low impedance to the transmission line feeding it and the transmission line can energize the antenna with a minimum standing wave ratio. Upper loaded antennas normally have male threads on their lower extremity and are screwed into a threaded socket in an associated mount.

Thus heretofore if one purchased a base loaded antenna and mount he was precluded from using a more efficiently radiating upper loaded antenna with his mount because of the different threading arrangement of the two types of antennas and mounts. Interconnection between an antenna of one type and the mounting means of another type was impossible.

STATEMENT OF THE INVENTION

The present invention provides an upper loaded antenna which can easily replace a base loaded antenna by interconnecting to a threaded stud on a mount to provide a substantial improvement in the signal strength transmitted when compared to that transmitted by the base loaded antenna. Moreover the interconnection means supplied at the base of the upper loaded antenna is capable of interconnection to differing heights of studs on mounts for base loaded antennas produced by several different manufacturers.

In accordance with the present invention an upper loaded antenna is provided which has a female threaded socket at its base which mates with the male threaded stud on existing mounts heretofore used with base loaded antennas.

Further in accordance with the present invention, a spring loaded center contact is provided within the female socket allowing interconnection with mounts having male threaded studs of varying heights.

In accordance with a more limited aspect of the present invention, the spring loaded electrical contact means is slightly recessed from the top surface of the female socket such that it will not come in contact with the stud and thereby be deformed or jammed.

The principal object of the invention is to provide an upper loaded antenna which can be screwed onto existing mounts previously used with base loaded antennas.

A further object of the invention is to provide an upper loaded antenna which is capable of being screwed onto a number of different height studs made by different manufacturers.

Still another object of the invention is the provision of an upper loaded mobile antenna which can be easily and repeatedly connected and disconnected from existing stud type mobile antenna mounts without jamming.

These and other objects and advantages of the present invention will become apparent from the following description.

BRIEF DESCRIPTION OF THE DRAWINGS

In this specification, the drawings include the following view.

DESCRIPTION OF THE PREFERRED EMBODIMENT

Figure 1:
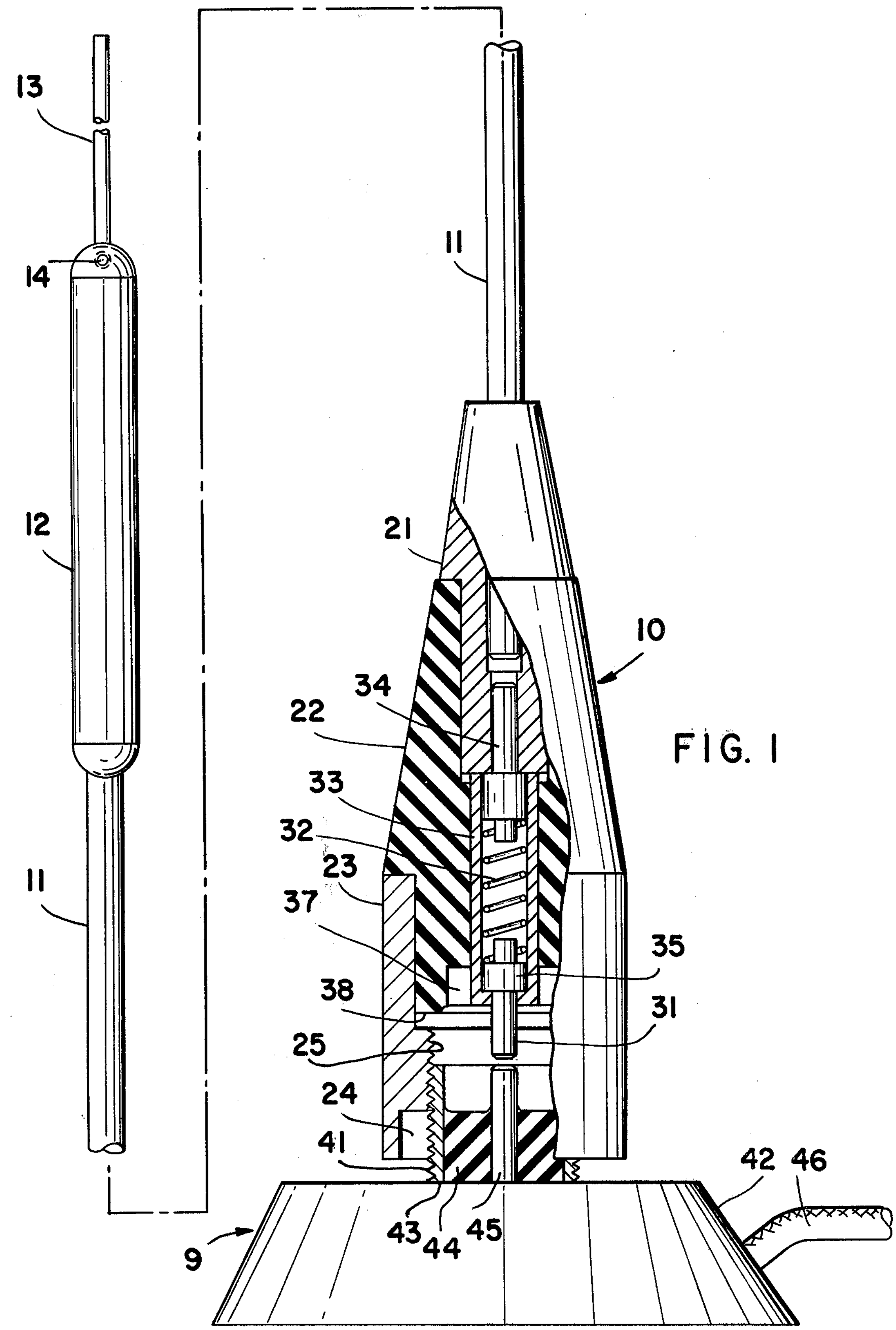
FIG. 1 is a plan view of an upper loaded antenna having a portion of its base cut away to show interior detail illustrating a preferred embodiment of the invention.

Referring now to the drawing, wherein the showings are for the purpose of illustrating a preferred embodiment of the invention only and not for the purpose of limiting same, FIG. 1 shows: a mounting base 9; an interconnecting assembly 10; a lower radiating rod 11; a coil assembly 12; and a tip rod 13.

The construction of the radiating rods 11, 13 and the coil assembly form no part of the present invention and may take any one of a number of different forms. In the embodiment shown the lower radiating rod 11 is permanently fixed at its lower end to the interconnecting assembly 10 and at its upper end to the coil assembly 12. The coil assembly 12 comprises a loading coil in a weatherproof housing. In the present embodiment the tip rod 13 is slidable in an opening in the upper end of the coil assembly and secured in any adjusted position by a set screw 14. This allows the adjustment of the tip rod so that the antenna may be precisely tuned to the desired operating frequency.

For best results the loading coil 12 is positioned such that the lower radiating rod 11 is approximately twice as long as the tip rod 13. In the present embodiment, for 26 megahertz operation, the lower radiating rod 11 is approximately 26 inches (66 cm.) long and the tip rod 13 is adjustable about a nominal length of 13 inches (33 cm.) The loading coil 12 has 79 turns of no. 25 gauge wire wound on an insulating member 9/32 inches in diameter and 1 and 61/64 inches in length.

The mount 9 forms no part of the present invention and may take any of the known forms e.g. gutter mount, trunk lid mount or as shown a magnetic mount. Importantly the mount has a threaded male stud 41 extending above the top surface of a plastic housing 42 and a central exposed contact member 45. The stud 41 has a metal outer threaded sleeve 43 connected to electrical ground which surrounds an insulator 44 which in turn surrounds and isolates the center contact member 45 exposed at the upper surface of the insulator. The stud 41 has a $\frac{5}{8} \times 20$ thread on its outside surface and may have varying heights depending on the manufacturer. The signal from the transmitter/receiver is carried to the mount by a coaxial cable 46.

In the past a base loaded antenna was normally screwed onto the stud 41. The base loaded antenna typically has a metallic threaded socket in its base which screws onto the stud 41 and a central spring sleeve contact which slides over and contacts the center conductor 45.

The interconnecting assembly 10 shown in FIG. 1 provides a unique means of electrically and mechanically connecting an upper loaded antenna to any of a number of different citizens band mobile antenna mounts made by different manufacturers for base loaded antennas. This is accomplished by allowing the interconnecting assembly 10 to accommodate mounts 9 having threaded studs 41 with heights varying within selected limits.

In the embodiment shown the interconnecting assembly 10 is comprised of only seven parts which are permanently fitted together forming a compact and reliable unit. The assembly includes a metallic upper adapter 21 which receives the lower end of the lower radiating rod 11. The lower end of adapter 21 extends into an insulator 22 having a central opening through its entire length. The upper end of a metallic lower adapter 23 fits over the lower end of the insulator 22. The lower end of adapter 23 has a bottom recess 24 which is circular in cross section and has a diameter substantially greater than the male threaded connector 41 on the mount 9. Any ridges or burrs around the base of the threaded connector 41 will be accommodated by this recess. Above this recess, the interior of the lower adapter 23 has a $\frac{5}{8} \times 24$ female thread 25 for mating with the corresponding thread on stud 41 on the mount 9. Both the recess 24 and the thread 25 are coaxial with the centerline of the antenna as a whole.

The interconnecting assembly 10 also includes a central contact member slidable within a metallic sleeve 32 and a spring 33 within the sleeve which biases the contact member 31 in a downward direction. A restricted aperture at the sleeve's lower end forming a shoulder engages a shoulder formed by an enlarged portion 35 on the contact member 31 and keeps the contact member within the sleeve 32. The metallic sleeve 32 has a metal plug 34 in its upper end which in turn fits into a passage in the upper adapter 21. Thus positive electrical contact is maintained between the upper adapter 21, the plug 34, the sleeve 32, and the contact 31 and electrical isolation is maintained between these structures and the threaded lower adapter 23. The moveable contact member 31 enables the assembly to be mounted securely on threaded studs of varying height.

The interconnecting assembly 10 is shown only partially threaded onto the mount 9. Normally, the interconnecting assembly 10 will be screwed down until either the lower adapter 23 abuts the mount housing 42 or the bottom surface 38 of insulator 22 abuts the threaded stud 41, depending upon the height of the threaded stud 41 on a particular mount. Because the bottom surface of the sleeve 32 is slightly recessed from the bottom surface 38 of the insulator 22 and an annular recess 37 is provided in the bottom surface 38 of the insulator, the outer metallic thread 43 will abut against the insulator 22 before any part of the threaded stud 41 contacts the sleeve 32. This prevents deformation of the sleeve 32 and jamming of the contact 31. The antenna may be repeatedly connected and disconnected from the mount 9 without placing undue pressure on the electrical connection or surrounding material thereby deforming the contact 31 or the sleeve 32. Any deformation or jamming at this point could result in a poor electrical connection to the antenna and seriously reduce its radiating ability.

Thus, an interconnecting assembly is provided at the base of an upper loaded antenna which can be repeatedly and easily connected to and disconnected from various mounts intended for use with base loaded antennas.

The invention has been described with reference to a preferred embodiment. Obviously modifications and alterations will occur to others upon a reading and understanding of this specification. It is my intention to include all such modifications and alterations insofar as they come within the scope of the appended claims.

Having thus described my invention, I claim:

1. In an upper loaded vertical citizens band radio antenna comprised of upper and lower axially spaced aligned radiating rods; a loading coil intermediate said rods with its end terminals electrically connected to the adjacent ends of said rods and an interconnecting assembly fixed to the bottom of said lower radiating rod, said interconnecting assembly including an upper metallic adapter connected to said lower rod, an insulator having a central bore attached to the lower end of said upper adapter, a metallic lower adapter having a threaded central bore attached to said insulator, the improvement which comprises: spring loaded electrical connection means disposed in said central bore of said insulator comprised of a metallic sleeve having a restricted aperture at its lower end, conducting means engaging said sleeve and said upper adapter, a contact having an extension portion exiting said sleeve through said restricted aperture and an enlarged shoulder portion retained within said sleeve and a spring abutting said contact urging said contact downward.

2. In a radio antenna for use with citizens band mobile antenna mounts having a base portion and an upstanding male threaded portion comprised of an outer metallic threaded portion, an insulating portion within said threaded portion and a central conductor exposed at the upper end of said insulating portion said antenna comprising:

a lower radiating rod;

a coil assembly having a loading coil attached to the top of said lower radiating rod;

a tip rod attached to the top of said coil assembly;

an interconnecting assembly on the lower end of said lower radiating rod including an upper metallic adapter connected to said lower radiating rod, an insulator surrounding said upper adapter and having a central bore, a lower adapter having a threaded central bore attached to said insulator; the improvement which comprises: a metallic sleeve disposed within the central bore of said insulator having a restricted aperture at its lower end, a metallic plug fixed in the upper end of said sleeve and also engaging said upper adapter; a contact having a cylindrical portion exiting said sleeve through said restricted aperture and an enlarged shoulder portion retained within said sleeve; and a spring abutting said plug at its upper end and said contact at its lower end thereby urging said contact downward.

3. The improvement of claim 2 wherein said sleeve is recessed with respect to the bottom surface of said insulator.

4. The improvement of claim 3 wherein an annular recess having a diameter larger than said sleeve and concentric with said sleeve is provided in said bottom surface of said insulator.

5. The improvement of claim 4 wherein an enlarged recess is provided in the bottom surface of said lower adapter concentric with said threaded central bore.

* * * * *